Patented Sept. 15, 1953

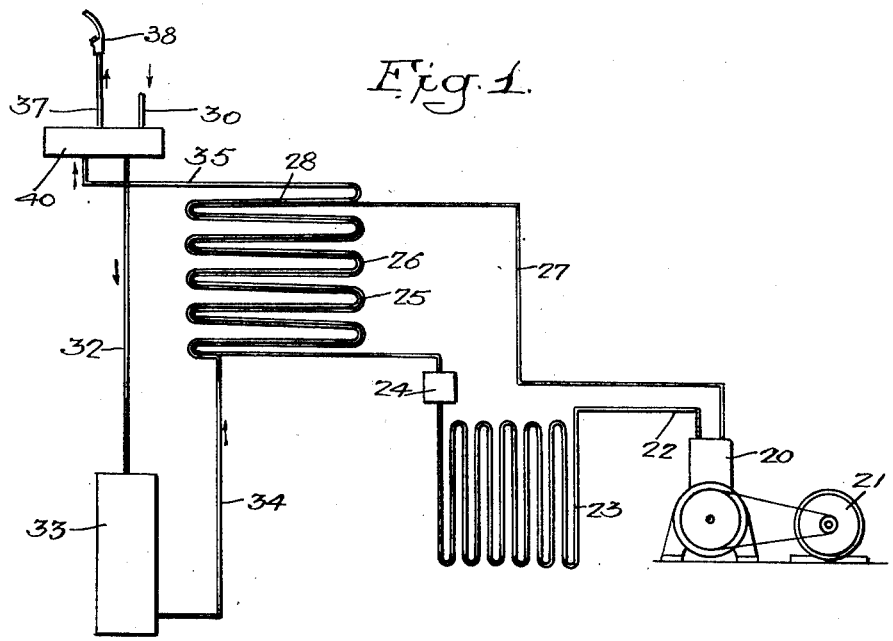
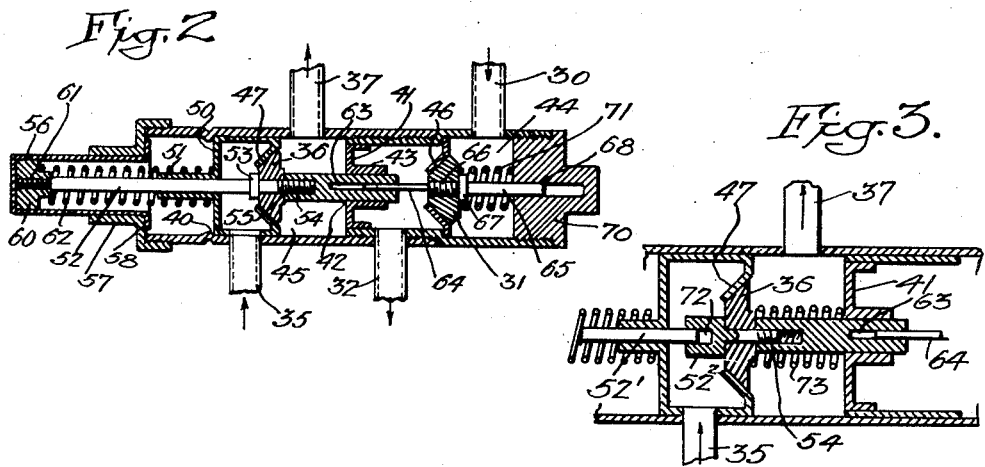

2,652,071

UNITED STATES PATENT OFFICE 2,652,071

VALVE

Samuel O. Morrison, Media, Pa.; Ella P. Morrison, executrix of said Samuel O. Morrison, deceased, assignor to Sunroc Refrigeration Company, Dover, Del., a corporation of Delaware Original application November 29, 1948, Serial No. 62,467. Divided and this application October 17, 1949, Serial No. 124,765

1 Claim. (Cl. 137—630.22)

This application is a division of my application Serial No. 62,467, filed November 29, 1948, now abandoned.

The present invention relates to valves for fluid pressure or refrigeration systems and to protection of the same against the consequences of pressure and of freezing.

A purpose of the invention is to relieve the pressure on a vessel at the time flow of fluid in the vessel ceases and to avoid the accumulation of abnormal pressure when flow of fluid in the vessel starts.

A further purpose is to maintain a closed vessel such as a tank, filter, water cooling unit or the like under minimal pressure during inactive periods so as to reduce the danger of damage from the pressure and particularly to avoid or minimize the damage due to freezing.

A further purpose is to provide an inlet and an outlet valve to a closed vessel which are both operated by a common operator so that when the operator functions to open a discharge from the vessel it will likewise open an inlet to the vessel, and when it functions to close a discharge from the vessel it will likewise close an inlet to the vessel.

A further purpose is to provide the inlet and outlet valves in a common housing provided with separate valve chambers.

A further purpose is to open the outlet valve shortly before the inlet valve is opened and to close the inlet valve shortly before the outlet valve is closed, preferably by lost motion in the operators.

A further purpose is to reduce the lead time of the opening of the outlet valve before the opening of the inlet valve and of the closing of the inlet valve before the closing of the outlet valve to a very short time, suitably less than a second, to minimize syphoning.

Further purposes appear in the specification and in the claim.

In the drawings I have chosen to illustrate one only of the numerous embodiments in which my invention may appear, choosing the form shown from the standpoints of convenience in illustration, satisfactory operation and clear demonstration of the principles involved.

Figure 1 is a diagrammatic view of a fluid pressure system, preferably a refrigeration system, to which the invention has been applied.

Figure 2 is an axial section of a valve employed in the present invention.

Figure 3 is an enlarged fragmentary section corresponding to Figure 2 and showing a variation.

In the drawings like numerals refer to like parts throughout.

Describing in illustration but not in limitation and referring to the drawings:

In fluid pressure systems such as tanks and piping in chemical plants, oil refineries, water distribution systems, filters, refrigeration systems and especially water coolers, it is common practice to maintain pressure vessels such as tanks, filters, heat transfer units, and the like continuously under a source of pressure, and to provide a valve at the outlet to control flow, opening the valve when discharge is desired, and closing the valve when discharge is to be cut off. Under this program, the pressure vessel or whatever character is continuously exposed to pressure, and is not only liable to fatigue failure of the metal of the walls (or creep where high temperatures are used), but is also on the law of averages subject to those freaks of operation which cause abnormal pressure surges of the character associated with water hammer in a water distribution system. Accordingly the incidence of failure in such vessels is greatly increased. The problem is still further complicated in the case of refrigeration systems. Where a cooling coil or other heat transfer unit is maintained under pressure and freezing of the water or other liquid therein occurs as in a water cooler heat transfer coil, or in a cooled filter, or due to low atmospheric temperature in winter, the effect is likely to be disasterous, resulting not only by bursting of the vessel, but also by flooding of the surrounding area.

To overcome these difficulties, the preesnt invention is designed to cut off a vessel from contact with the source of pressure whenever flow ceases, and at the same time to reduce or eliminate the pressure in the vessel for the period when the vessel is inactive. When flow is again restored, the invention assures that full line or pipe pressure does not build up in the vessel at the time of or preparatory to discharge. In accordance with the invention, inlet and outlet valves operated by common mechanism are provided so that, when discharge is desired, both outlet and inlet to the vessel will be established. In the preferred form of the invention, a slight lead time is established in opening of the outlet and in closing of the inlet so that there is no chance for the pressure from the pressure source to build up to its full value in the vessel. By this means the system is protected against the consequences of maintained pressure and the danger from freezing is reduced to a minimum, since in general an open or low pressure system is much less likely to be damaged by freezing than a closed system.

In accordance with the invention, the vessel may be of any suitable character whether a tank, filter, heat transfer unit or the like, but for convenience it is preferred to illustrate a system including a filter and a heat transfer unit. While this appears in a water cooling refrigeration system, the invention can be applied to other systems as already explained.

As shown in Figure 1, the mechanical refrigeration unit illustrated comprises a compressor 20 driven by an electric motor 21 and providing high pressure refrigerant (such as Freon) in pipe 22 leading to condenser 23, from which the refrigerant passes through a constrictor 24 (expansion valve, capillary tube or other constrictor). From the constrictor the refrigerant passes to the refrigerant tube 25 of an evaporator or heat transfer cooling unit 26, and thence returns by a refrigerant pipe 27 to the suction side of the compressor. The evaporator 26 has in heat transfer relation with the refrigerant coil (arranged side by side in contact) a separate water cooling coil 28 which receives water from a high pressure source such as a city water distribution system 30 through an inlet valve 31 to a pipe 32, thence to a water filter 33 and then by a pipe 34 to the water cooling coil 28. From the cooling coil the water passes by a pipe 35 to an outlet valve 36 and from the outlet valve it flows by a pipe 37 to a dispenser 38 (faucet, bubbler or the like).

The inlet and outlet valves are desirably contained in a housing 40 shown in detail in Figure 2. The housing is tubular and is separated near the middle by a transverse partition 41 having a center opening 42 provided with a tubular guiding skirt 43. On one side of the partition is an inlet valve chamber 44, and on the other side of the partition is an outlet valve chamber 45, wholly separate therefrom. The inlet valve chamber is divided intermediate its ends by a circular inlet valve seat 46 which cooperates with the circular inlet valve 31 in closed position. The connection 30 communicates with the inlet valve chamber on one side of the seat (preferably the side remote from the outlet valve) and the connection 32 communicates with the inlet valve chamber on the other side of the seat. The outlet valve chamber 45 is divided by a circular outlet valve seat 47 in line with the inlet valve seat and cooperating with the circular outlet valve 36 when it is closed. Both the inlet and outlet valve open by movement from left to right in Figure 2, and since the valves are in line and coaxial with the circumferential housing they travel back and forth without difficulty.

The forward end of the outlet valve chamber is closed by a partition 50 having a central opening surrounded by a tubular guiding skirt 51. Guided in the skirt 51 is a circular outlet valve plunger 52 at the axis, and engaging the outlet valve between a shoulder 53 on the plunger and a plunger extension 54 threaded on the plunger at 55 beyond the outlet valve. The plunger extension is slidably guided in the skirt 43 of the partition 42 to prevent leakage between the chambers. At the forward end of the housing and conveniently located adjacent the dispenser for access to the hand of the user, is an operating handle 56 consisting of a sleeve guided by a tubular skirt 57 on the end of the housing and limited in outward movement by a flange 58 within the housing. The handle has pressed therein a nut 60 which makes engagement with a threaded end 61 on the plunger 52. An outlet valve compression restoring spring 62 extends between the nut 60 and the partition 50, urging the outlet valve plunger handle and the outlet valve into the closed position of the valve.

The outlet valve plunger extension 54 has an axial bore 63 at its rearward end, which receives the forward end 64 of an inlet valve plunger 65 threaded on to the inlet valve at 66 and having a shoulder 67 at the side of the inlet valve remote from the outlet valve. The rearward end of the outlet valve plunger is guided in a bore 68 in the rear end 70 of the housing. The inlet valve is restored to closed position by a spring 71 acting around the inlet valve stem between the rear end of the housing and the inlet valve.

It will be evident that a lost motion is provided between the outlet valve plunger and the inlet valve plunger so that the outlet valve is fully open before the inlet valve begins to open and so that the inlet valve is closed before the outlet valve closes.

The dispenser is of course open to atmosphere, and it will be evident that the outlet valve when connected as shown in the present invention functions as a relief valve, since if pressure from any source should accumulate in the vessel, as for example because of leakage of the inlet valve, such pressure will be applied on that side of the outlet valve tending to open the outlet valve against the action of the spring 62. The spring 62 is therefore adjusted or chosen as to force not merely to restore the outlet valve and its operating parts to closed position, but to determine the relief pressure at which the outlet valve will function as a relief valve in case pressure develops in the vessel.

In operation it will be understood that the user will merely press the button or handle in the usual manner to operate the dispenser, and will be entirely unconcerned with the action of the valve. As the user begins to operate the handle, the outlet valve will open, thus assuring that no high pressure can accumulate in the vessel when the inlet valve opens. Further pressure on the handle will open the inlet valve as soon as the lost motion is taken up, and flow of fluid will occur. In the particular system shown, the flow will be of water through the dispenser, but it could equally be of oil, chemical, gas or any other fluid from a system. As soon as the user desires to cut off the discharge, he releases the handle. As soon as the handle moves back far enough, the outlet valve closes under the action of the spring 67. Further motion of the handle results in closing the inlet valve. For a short time, however, the inlet valve is closed and the outlet valve is open, thus relieving the pressure in the vessel, and assuring that in case the vessel should freeze at a later time the damage will be minimized.

In normal operation the time interval between the opening of the outlet valve and the opening of the inlet valve and between the closing of the inlet valve and the closing of the outlet valve will be very short, normally a fraction of a second, such as one-tenth to one-hundredth of a second. Even in water cooling systems which would have a tendency to syphon water out of the water cooling unit under such conditions, the usual time required to effect appreciable syphoning is of the order of ten seconds, and therefore very little opportunity for syphoning occurs. Of course if syphoning takes place, subsequent opening of the inlet valve may result in very noisy introduction of liquid to fill space occupied by air, and cooling will not be efficient due to the air in the system.

It will be evident that while the invention is of special utility in connection with water coolers, and while the feature of opening the outlet before the inlet is opened and closing the inlet before the outlet is closed is of great importance, there is also great utility in the provision of inlet and outlet valves operated by the same operator and preferably in the same housing, even without the other features.

In some cases the valve of Figure 2 may be connected differently from the arrangement previously described, as for example where it is desired to employ the relief valve feature to discharge into the inlet rather than into the outlet. In this case the connection 37 may be made to the high pressure inlet, while the connection 35 will extend from the valve to the tank or other closed vessel, the connection 32 will extend from the tank or other closed vessel, and the connection 30 be made to the discharge. Where the vessel is likely to develop internal pressure as from a chemical reaction, and the valves are closed, such pressure will in this instance be discharged into the high pressure inlet. In case the valve is connected in this manner, the advantageous time lead between the operation of the two valves could not be employed.

In the form of Figure 2 the spring which acts on the handle also acts as the relief valve spring and the relief valve during operation is subjected to the frictional drag of the engagement of the plunger 52 with the skirt 51 (stuffing box). In some cases this may not be desirable and in Figure 3 I show a variant in which the relief valve operates against an independent relief valve spring and is not subjected to the frictional drag of the plunger 52 passing through the skirt. In this form the plunger 52' has a lost motion connection 72 to an extension 52², which connects to the valve 36. The lost motion at 72 is taken up before the valve 36 unseats when the plunger 52' is pushed by the operator. The lost motion, however, permits the valve 36 when operating as a relief valve to unseat under the action of a relief valve spring 73 acting from the partition 41 to the valve 36 in accordance with the relief valve pressure desired, while the spring 62 functions entirely as a handle return spring and does not determine the pressure at which the relief valve will act.

In operation the form of Figure 3 will act in the same manner as that of Figure 2, except that the extra lost motion 72 must be taken up before the valves can open manually, and on the other hand the relief valve will act without moving the plunger 52'.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a valve, a cylindrical valve housing, walls forming an inlet valve chamber at the rear end of the housing, an inlet connection at relatively high pressure to the inlet valve housing, walls forming an outlet valve chamber hydraulically separate from the inlet valve chamber toward the front end of the housing, an outlet connection to the outlet valve chamber at relatively low pressure, an inlet valve seat in the inlet valve chamber directed toward the rear of the valve, an outlet valve seat in the outlet valve chamber directed toward the rear of the valve in line with the inlet valve seat, an operating handle at the front of the housing, an outlet valve plunger connected to the handle and extending through the outlet valve seat, an outlet valve secured on the outlet valve plunger engaging the outlet valve seat in closed position, and closing by motion of the outlet valve plunger toward the front of the housing, spring means located inside the handle urging the outlet valve plunger toward closed position of the outlet valve, an inlet valve plunger extending in prolongation of the outlet valve plunger, making a lost motion connection with the outlet valve plunger and extending through the inlet valve seat, an outlet valve secured on the inlet valve plunger engaging the inlet valve seat in closed position and closing by motion toward the front of the housing, spring means urging the inlet valve toward closed position, a connection to the inlet valve seat on the side toward the front of the valve housing and a connection to the outlet valve seat on the side forward of that valve seat in the housing, the two connections last named being connected to one another to provide flow through the inlet valve seat and through the connections last mentioned and then through the outlet valve seat when both valves are open.

SAMUEL O. MORRISON.

References Cited in the file of this patent

UNITED STATES PATENTS

| Number | Name | Date |
| --- | --- | --- |
| 616,197 | Moller | Dec. 20, 1898 |
| 1,540,181 | Olson | June 2, 1925 |
| 2,240,791 | Leesburg | May 6, 1941 |
| 2,408,541 | Wilson | Oct. 1, 1946 |
| 2,470,471 | Carlton | May 7, 1949 |